United States Patent [19]

Ferracini et al.

[11] Patent Number: 5,335,295
[45] Date of Patent: Aug. 2, 1994

[54] SYSTEM AND METHOD FOR SCALING A DIGITAL IMAGE

[75] Inventors: Bruno Ferracini, Milan, Italy; Jorge Gonzalez-Lopez, Seville, Spain; Giancarlo Pettazzi, Milan, Italy

[73] Assignee: International Business Machines Corporation, Armonk, N.Y.

[21] Appl. No.: 697,141

[22] Filed: May 8, 1991

[51] Int. Cl.[5] .................................... G06K 9/42
[52] U.S. Cl. ........................ 382/47; 358/451
[58] Field of Search ............... 382/47; 358/77, 160, 358/451; 340/728, 731

[56] References Cited

U.S. PATENT DOCUMENTS

| | | | |
|---|---|---|---|
| 4,280,143 | 7/1981 | Judd | 358/260 |
| 4,303,948 | 12/1981 | Arai et al. | 358/287 |
| 4,394,693 | 7/1983 | Shirley | 358/298 |
| 4,412,252 | 10/1983 | Moore et al. | 358/160 |
| 4,503,469 | 3/1985 | Kato | 358/287 |
| 4,528,693 | 7/1985 | Pearson et al. | 382/47 |
| 4,610,026 | 9/1986 | Tabata et al. | 382/47 |
| 4,656,664 | 4/1987 | Anderson et al. | 382/47 |
| 4,712,140 | 12/1987 | Mintzer et al. | 358/260 |
| 4,725,892 | 2/1988 | Suzuki et al. | 358/287 |
| 4,809,345 | 2/1989 | Tabata et al. | 382/47 |
| 4,833,531 | 5/1989 | Abe et al. | 358/77 |
| 4,872,064 | 10/1989 | Tutt et al. | 358/464 |
| 4,885,786 | 12/1989 | Anderson et al. | 382/47 |
| 4,907,171 | 3/1990 | Nagashima | 364/518 |
| 4,907,284 | 3/1990 | Ohuchi | 382/47 |
| 4,988,984 | 1/1991 | Gonzalez-Lopez | 340/728 |
| 5,101,443 | 3/1992 | Behrmann-Poitiers | 382/47 |

FOREIGN PATENT DOCUMENTS

| | | | |
|---|---|---|---|
| 0143533 | 6/1985 | European Pat. Off. | G06F 15/64 |
| 61-194974 | 8/1986 | Japan | H04N 1/393 |

OTHER PUBLICATIONS

Ellis, *Second ACM-SIGOA Conference on Office Information Systems*, vol. 5, Nos. 1-2, pp. 36-45, Jun. 25-27, 1984, Toronto, Canada.
Dattilo, *IBM Technical Disclosure Bulletin*, vol. 32, No. 4A, pp. 194-195, Sep. 1989.
Morelli, *IBM Technical Disclosure Bulletin*, vol. 32, No. 4B, pp. 455-456, Sep. 1989.
Kumakura et al., *IBM Technical Disclosure Bulletin*, vol. 31, No. 11 pp. 57-59, Apr. 1989.
Hori et al., *IBM Technical Disclosure Bulletin*, vol. 30, No. 12, pp. 38-39, May, 1988.
Friend, *IBM Technical Disclosure Bulletin*, vol. 29, No. 10, pp. 4369-4372, Mar., 1987.
Shinzoh, *IBM Technical Disclosure Bulletin*, vol. 29, No. 3, pp. 1286-1288, Aug. 1986.
Anderson et al., *IBM Technical Disclosure Bulletin*, vol. 27, No. 6, pp. 3648-3652, Nov., 1984.
Kashiwagi et al., *IBM Technical Disclosure Bulletin*, vol. 27, No. 7B, pp. 4323-4325, Dec., 1984.
Kitazawa et al., *IBM Technical Disclosure Bulletin*, vol. 27, No. 5, pp. 3019-3020, Oct., 1984.
Kikutani, *IBM Technical Disclosure Bulletin*, vol. 27, No. 5, pp. 2984-2986, Oct., 1984.

*Primary Examiner*—David K. Moore
*Assistant Examiner*—D. R. Anderson
*Attorney, Agent, or Firm*—Sterne, Kessler, Goldstein & Fox

[57] ABSTRACT

System and method for scaling the size of a digital image from a first digital image to a second digital image by a specified scaling factor of G. The apparatus comprises an interpolator module configured to magnify the first digital image by a first scaling factor G1. The interpolator is further configured to output an intermediate digital image indicative of the magnified first image. The apparatus further comprises a shrinking module configured to shrink the intermediate digital image outputted by the interpolator module by a second scaling factor G2 to thereby generate the second digital image. Scaling factor G2 is a power of two.

13 Claims, 8 Drawing Sheets

10 SAMPLES

12 SAMPLES

3 SAMPLES

SYSTEM AND METHOD FOR SCALING A DIGITAL IMAGE

DESCRIPTION

1. Technical Field

The present invention relates generally to image processing. More particularly, the present invention relates to reducing the size of a digital image.

2. Background Art

Countless applications exist where a digital image needs to be reduced. A simple method used to achieve the reduction operation is pixel decimation. Pixel decimation generally consists of selecting every Nth pixel in the X direction of the original image and every Mth pixel in the Y direction of the original image, and discarding all other pixels to obtain a reduction in the size of the original image.

A disadvantage of this method, however, is that the information contained in the discarded pixels is lost completely. Images containing linear features, like maps or text, experience an annoying visual effect when processed with this method.

One way to mitigate this effect is to apply some filtering function that computes some local weighted average on the input pixels within a specified neighborhood around the position of the output pixel. The value of the output pixel is then obtained as a contribution of the corresponding input neighbor pixels. This technique has been applied by Tabata et al., "*High Speed Image Scaling for Integrated Document Management*" ACM 2nd Conf. on Office Information Systems, Toronto (June 1984), using a 2 by 2 neighborhood weighting window on the input image.

However, even this approach encounters the same problem when the reduction factor is over 2: some input pixels do not participate in the computation of any output pixel.

One way to avoid the problem is to extend the size of the neighborhood window or the filter kernel so that no input pixel is missed in the computation of the output pixels. The problem associated with this technique is that it requires different kernels for different scaling factors. Thus, the user may specify a scaling factor which may involve multiplication or division operations. Multiplication and divisional operations require complex circuitry, thus slowing down the image reduction process to unacceptable levels.

DISCLOSURE OF INVENTION

This invention discloses a method and apparatus for reducing a digital image by virtually any factor. In one embodiment, the apparatus comprises an electronic circuit for reducing the size of a first digital image to a second digital image by a specified scaling factor of G.

The electronic circuit first comprises an image buffer. The image buffer is configured to store the first digital image.

The electronic circuit further comprises an interpolator module. The interpolator module is configured to magnify the first digital image by a first scaling factor G1. The interpolator is further configured to output an intermediate digital image indicative of the magnified first image.

The electronic circuit further comprises a shrinking module. The shrinking module is configured to reduce the intermediate digital image outputted by the interpolator module by a second scaling factor G2. The reduced intermediate image corresponds to the second digital image.

The electronic circuit further comprises a frame buffer module. The frame buffer module is configured to store the second digital image.

The second digital image stored in the buffer module has a resultant scaling factor of $G = G1 \times G2$.

The electronic circuit further comprises a controller. The controller is configured to control the interpolator and the shrinking module.

The controller is further configured such that regardless of the overall specified scaling factor G, the shrinking module will always reduce the intermediate image by a power of two. In other words, the shrinking module is configured to reduce the intermediate image by factors of $\frac{1}{2}$, $\frac{1}{4}$, $\frac{1}{8}$, etc. As such, the shrinking module may comprise simple logic circuitry to perform the reduction operation. No complicated multiplication and/or division circuitry is necessary.

In contrast, the interpolator module is configured to magnify the first image by virtually any scaling factor. This feature allows the shrinking module to operate at scaling factors of a power of two. In other words, the scaling factor G1 of the interpolator module is varied such that a scaling factor G2 of the shrinking module is always a power of two and the overall scaling factor G is achieved.

The foregoing and other objects, features and advantages of the invention will be apparent from the following more particular description of (a) preferred embodiment(s) of the invention, as illustrated in the accompanying drawing(s).

BRIEF DESCRIPTION OF DRAWINGS

The following detailed description will be more fully understood with reference to the accompanying drawings in which.

BEST MODE FOR CARRYING OUT THE INVENTION

I. Overview

Figure 1:
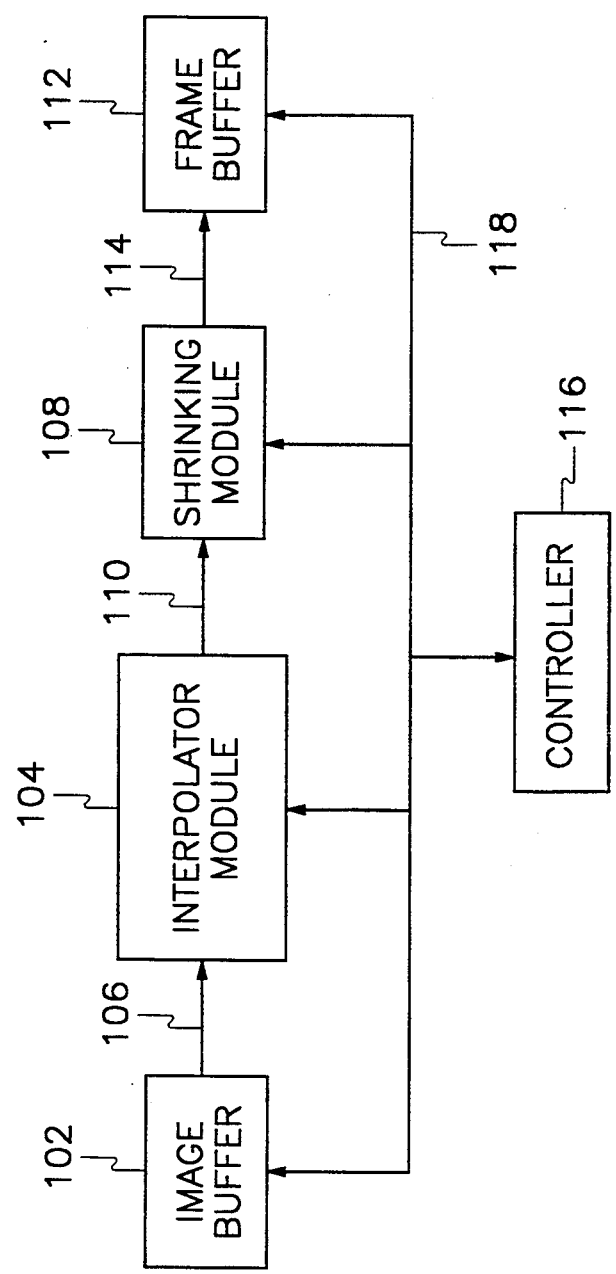
FIG. 1 is a high level block diagram showing one embodiment of the architecture of the present invention.

Referring to FIG. 1, a high level block diagram illustrates an image scaling circuit 100 of the present invention. The circuit 100 is configured to scale a digital image by a scaling factor of G. When scaling factor G is less than one, the image is reduced. The circuit 100 may also be used to magnify an image. In this case, the scaling factor G is greater than one.

The circuit 100 first comprises an image buffer 102. Image buffer 102 is a conventional memory device containing the digital image to be processed. The image buffer 102 may be loaded by any of a number of mechanical and/or electrical processes. By way of example only, the image buffer 102 may be loaded as a result of digitizing the output of a television camera.

The circuit 100 further comprises an interpolator 104. The interpolator 104 is an electronic device configured to magnify the image contained in the image buffer 102 by a specified factor.

The interpolator 104 implements a scaling factor, G1, of the form $$G1 = A/B; A \geq B \qquad (1)$$

where A and B are positive integers.

The interpolator 104 may take the form of any of a number of well known interpolators. By way of example only, interpolator 104 may be configured as disclosed by Tabata et al., "*High Speed Image Scaling for Integrated Document Management*" ACM 2nd Conf. on Office Information Systems, Toronto (June 1984), or by Gonzalez-Lopez, U.S. Pat. No. 4,988,984, entitled "Image Interpolator for an Image Display System," assigned to the assignee herein. The above two references, in their entirety, are hereby incorporated by reference into this specification.

The circuit 100 further comprises a shrinking module 108. As will be described more fully herein, shrinking module 108 is configured to shrink the image outputted by the interpolator 102 when a scaling factor G2 less than one is specified.

The circuit 100 further comprises a frame buffer 112. The frame buffer 112 is a two dimensional memory device configured to store the image outputted by the shrinking circuit 108 (referred to herein as the output image). Frame buffer 112 may take the form of a number of conventional memory devices. Such conventional memory devices, include but are not limited to, a single-buffer image display device, or a non-visible buffer of a double-buffer image display device.

The circuit 100 further comprises a controller 116. Controller 116 is a device configured to control the overall operation. In the preferred embodiment, controller 116 comprises a digital signal processor and discrete logic and programmable logic devices. The signal processor of controller 116 is model no. TMS320C25, available from Texas Instruments.

Controller 116, however, may take the form of a variety of conventional control devices. Such devices include, but are not limited to, a microprocessor or combination of microprocessor and hardwired logic or programmable logic controller (PLC).

Figure 2:
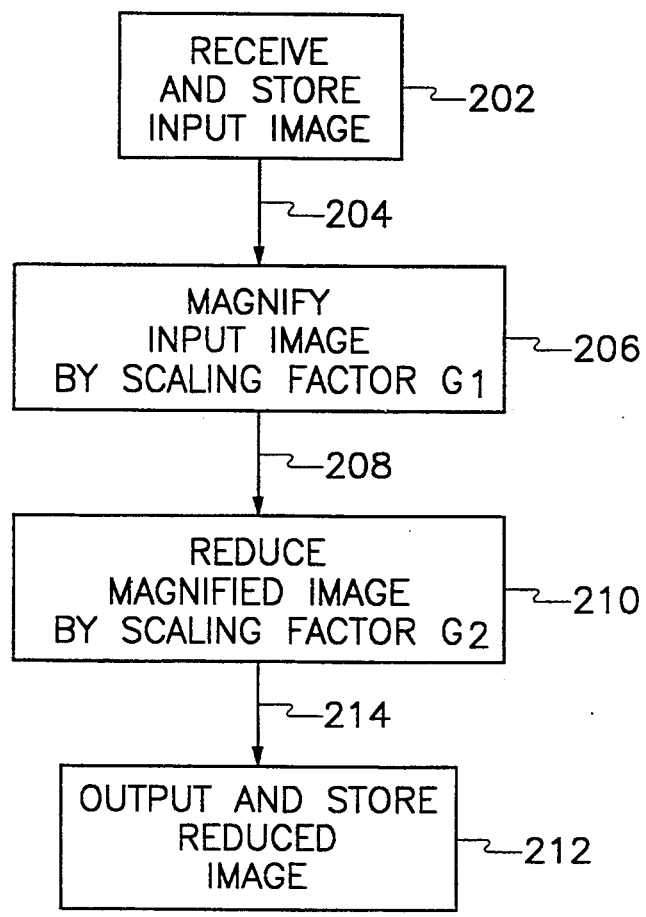
FIG. 2 is a high level block diagram showing one embodiment of the operation of the present invention.

Referring now to FIG. 2, where a high level illustration of the preferred method of operation of circuit 100 is shown. As shown by block 202, the circuit 100 operates to receive and store an image to be reduced, hereinafter referred to as the "input image." Control is then passed along a logic path 204 to a block 206.

As shown by block 206, the input image is then magnified by a scaling factor G1. Control is then passed along a logic path 208 to a block 210.

As shown by block 210, the image magnified as a result of the step block 206 is reduced by a scaling factor G2. Control is then passed along a logic path 214 to a block 212.

As shown by block 212, the shrinked image (output image) is outputted to a storage device.

As can be seen, the input image has thus been reduced by an overall Scaling factor of G=G1×G2.

II. Architecture

Figure 3:
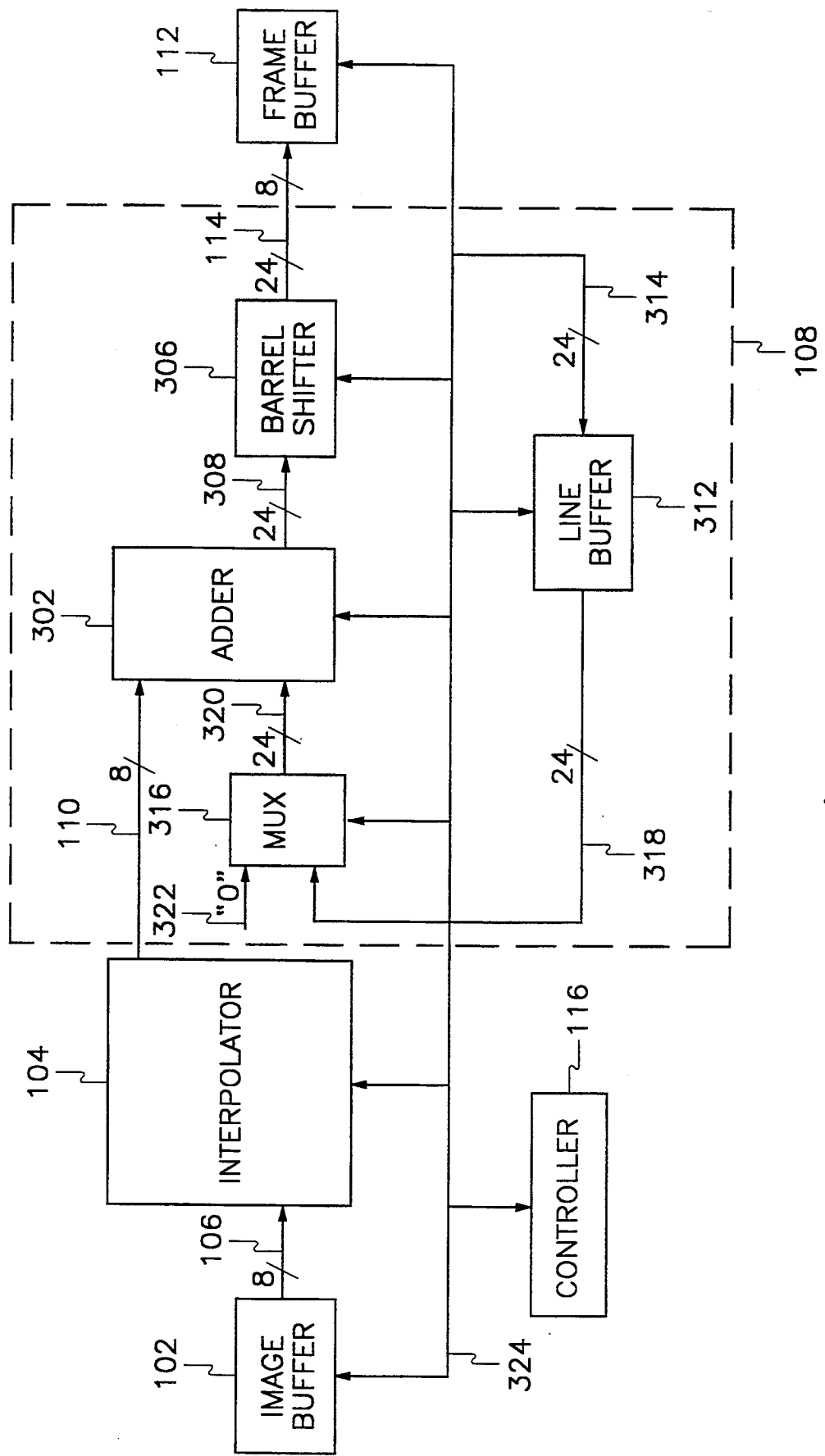
FIG. 3 is a high level block diagram showing a more detailed illustration of the architecture of the present invention.

Referring now to FIG. 3, where a more detailed illustration of the architecture of circuit 100, and more specifically, the shrinking module 108 is shown.

The shrinking module 108 comprises an adder 302. Adder 302 is configured to add binary numbers. Adder 302 may take the form of a variety of adders. In the preferred embodiment, adder 302 is a conventional 24 bit adder.

Shrinking module 108 further comprises a barrel shifter 306. Barrel shifter 306 is configured to perform an arithmetic right shift of h bits. One right shift is equivalent to a division of two in the binary system. The h bits is specified by the controller 116. The binary representation of the output is as follows:

$$Output = input/(2**h) \qquad (2)$$

where h is a parameter loaded by the controller 116. In the preferred embodiment, h may range from 0 to 16 shifts.

Shrinking module 108 further comprises a line buffer 312. Line buffer 312 is a memory buffer containing a number of locations equal to the frame buffer 112 horizontal size. Line buffer 312 may take the form of a number of conventional memory devices. Such conventional memory devices, include but are not limited to, a static random access memory device.

Shrinking module 108 further comprises a multiplexer 316. Multiplexer (Mux) 316 is configured to select the line buffer 312 output or the logical representation of the number zero ('0'), and input the same to the adder 302. Multiplexer 316 is also under control of the controller 116.

III. Operation

The operation of the circuit 100 will now be described. The operation of circuit 100 will first be described with reference to a one-dimensional example. Thereafter, an extension to a two-dimensional example will be given in more elaborate detail.

Figure 4A:
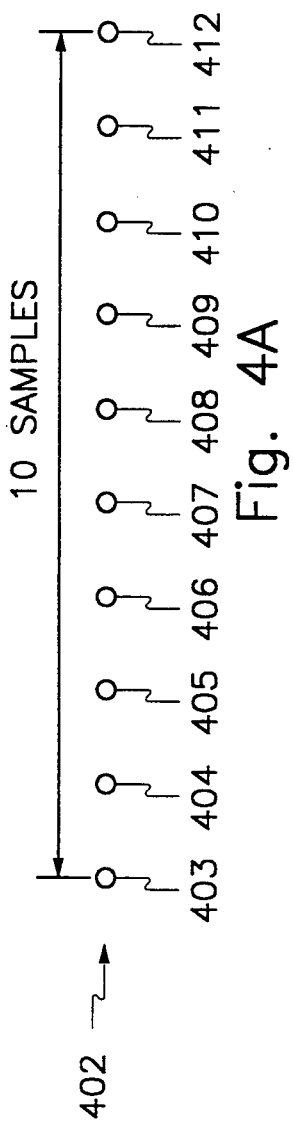
FIGS. 4, 4A-4C is a pictorial illustration of a one dimensional image reduced by a scaling factor of 3/10.
Figure 4B:
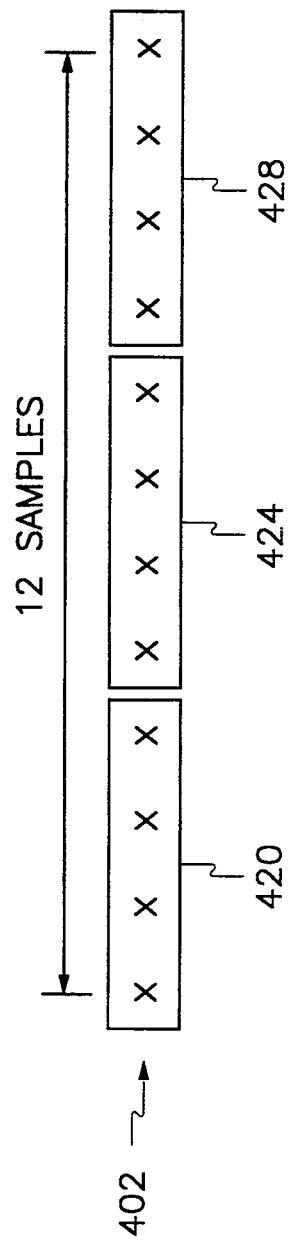
Figure 4C:
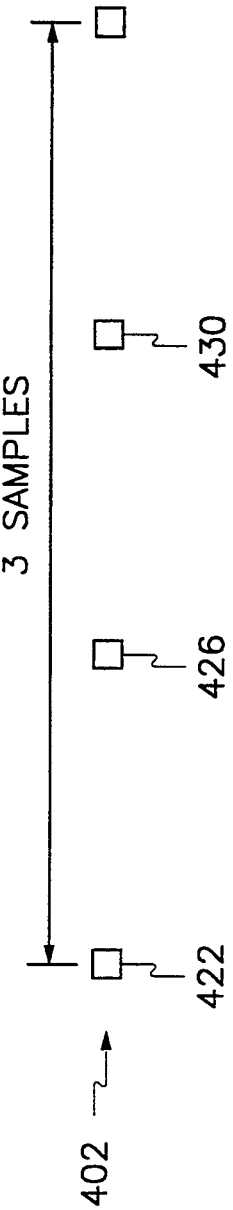
Figure 4:
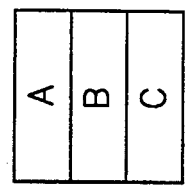

Referring now to FIGS. 4A–4C, where a one-dimensional image is shown reduced by a scaling factor G=3/10. Shown is part of a single row 402 of pixels 405–412 which form the input image. Assume that the user desires to reduce the input image by a scaling factor of =0.30 (or 3/10).

To achieve a scaling factor of G=0.30, the row 402 is magnified first by a scaling factor G1=G12/10 by the interpolator 104. The resultant image is hereby defined as the intermediate image. This intermediate image is shown in FIG. 4B. The mathematical foundation for calculation of G1 will be more fully described herein. For the present moment, assume that for a specified scaling factor of G=0.30, the interpolator 104 will initially magnify the image by a scaling factor of G1=12/10.

Thereafter, and as shown by FIG. 4C, the shrinking module 108 is then configured to shrink the intermediate image by a scaling factor of G2=1/4. The overall resultant scaling factor is

$$G = G1 * G2 = \frac{12}{10} * \frac{1}{4} = \frac{3}{10}$$

As will be more fully described herein, the shrinking operation performed by shrinking module 108 is implemented by averaging four neighboring pixels of a first cell 420 of the intermediate image and assigning the average value to the output pixel 422. The average of the pixels in cell 424 is assigned to output pixel 426. The averaging of pixels in cell 428 is assigned to output pixel 430.

In the preferred embodiment, the averaging is done over a number of pixels of the intermediate image that is always a power of two. By requiring the number of pixels in a given row and/or column of a cell to be a power of two, the division required for averaging the neighboring pixels is a simple shift operation which can be performed by barrel shifter 306. As such, complicated division and/or multiplication circuitry is unnecessary.

The mathematical foundation will now be described. The one-dimensional case is presented first. The concept can be easily extended to two dimensions.

The specified scaling factor $G_x$ ($G_x \leq 1$ in the preferred embodiment) is decomposed into two scaling factors:

$$G_x = G1_x G2_x; \quad G_x \leq 1; \tag{3}$$

where $$G1_x = A_x/B_x; \quad \begin{matrix} B_x \leq A_x \\ A_x, B_x \text{ positive integers} \end{matrix} \tag{4}$$

and $$G2_x = 1/2^{**}q_x; \quad \begin{matrix} q_x \geq 0 \\ q_x \text{ integer} \end{matrix} \tag{5}$$

It follows that $$G_x = G1_x G2_x = \frac{A_x}{(2^{**}q_x)B_x} \tag{6}$$

$q_x$ is selected such that $$q_x = CEIL(-LOG2(G_x)) \tag{7}$$

where CEIL is the smallest integer equal to or greater than the operand, and LOG2 is the logarithm in base 2 function.

The value $A_x$ is usually fixed in the implementation of the interpolator 104. It follows from (6) that $$B_x = \frac{A_x}{(2^{**}q_x) G_x} \tag{8}$$

which may not be an integer. $B_x$ is approximated then by $B_x'$ as follows:

$$B_x' = ROUND\left(\frac{A_x}{(2^{**}q_x) G_x}\right) \tag{9}$$

where the ROUND function provides the closest integer to its operand. The absolute error $|B_x' - B_x|$ is obviously bounded as follows:

$$|B'_x - B_x| \leq 0.5 \tag{10}$$

where the vertical bars mean the absolute value of the expression in between. The resultant magnification factor is then given by $$G_x' = \frac{A_x}{(2^{**}q) B_x'} \tag{11}$$

where $G_x'$ is an approximation to the specified magnification factor $G_x$. The actual relative error defined as $$Er(G) = \left|\frac{G_x' - G_x}{G_x}\right| \tag{12}$$

can be shown to be approximated by $$Er(G) = \left|\frac{B_x' - B_x}{B_x}\right| < \frac{1}{A_x - 1} \tag{13}$$

Expression (13) assumes that $$A_x > 1 \tag{14}$$

as is the case in the implementation. The inequality in expression (13) is based on the fact that $$1 \leq (2^{**}q_x)G_x < 2 \tag{15}$$

as can be easily verified taking into account expressions (7) and (8). As an example, for $A_x = 1024$, the relative error for $G_x$ is less than 0.1%.

To initiate operation, the controller 116 requires the following information (note that there is some redundancy so that not all following parameters are strictly needed):

The specified scaling factors in X and Y ($G_x$ and $G_y$).
Origin and dimension of the input image (stored in image buffer 102).
Origin and dimension of the output image.

The controller 116 then computes:

$q_x$ and $q_y$ using equation (7). (One for each direction).
$B'_x$ and $B'_y$ using equation (9).
$G1_x$ and $G1_y$ as follows:

$$G1_x = \frac{A_x}{B'x}$$

$$G1_y = \frac{A_y}{B'y}$$

Typically, the interpolator 104 is configured such that $A_x = A_y = A$.

Thereafter, the controller 116 sets the operation of the interpolator 104 by specifying the origin and dimension of the input image, the scaling factors of the intermediate image ($G1_x$ and $G1_y$), and instructs it to start the operation. The controller 116 is then configured to start the operation of the shrinking module 108 by executing the flow diagram given in FIG. 7.

Figure 5A:
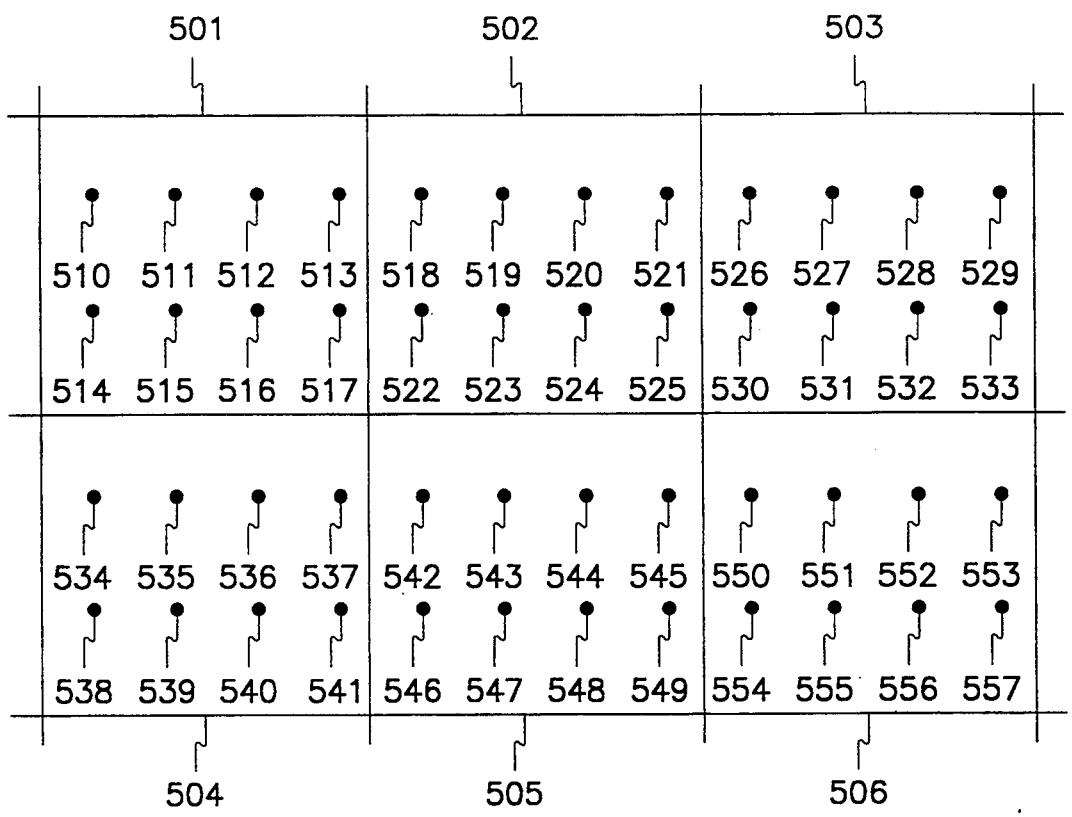
FIGS. 5A-5B are a pictorial illustration of a two dimensional image reduced by a scaling factor of $\frac{1}{4}$ in the X direction and $\frac{1}{2}$ in the Y direction. This example is explained in detail with reference to FIG. 7.
Figure 5B:
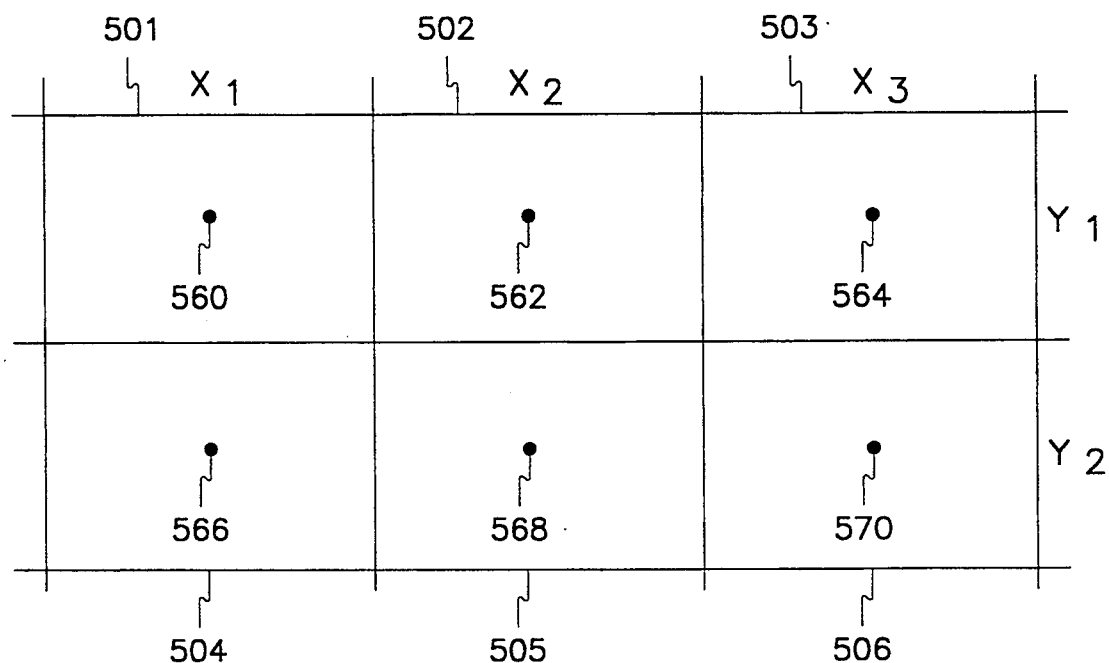

The operation of controller 116 will now be described with reference to a two dimensional example shown FIGS. 5A-5B and the flow chart of FIG. 7.

The input image (not shown) is magnified first by magnification factor G1x and G1y. This intermediate result is shown by FIG. 5A.

The intermediate result is conceptually decomposed into cells 501-506. Cells 501-506 are defined by M rows of pixels and by N columns of pixels. The number of pixels in both N and M are a power of two. Each cell corresponds to a single pixel of the output image. As will be shown herein, a value equal to the cell average is assigned to the corresponding output pixel.

Figure 6:
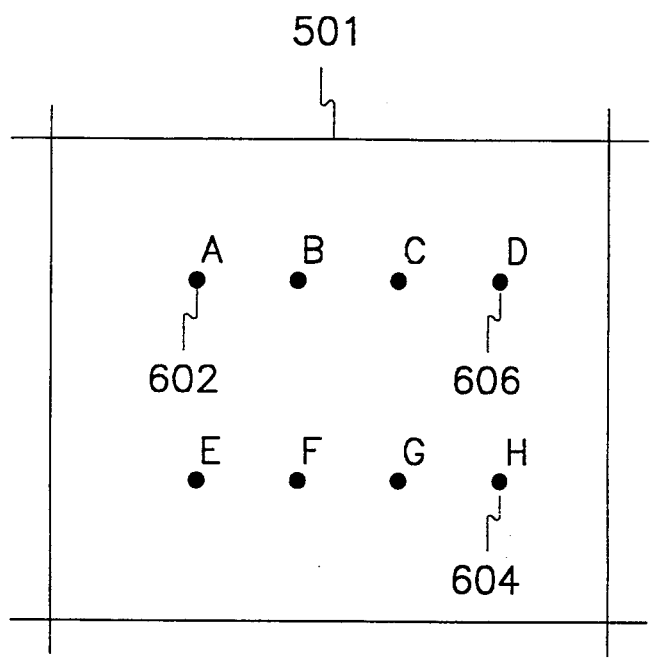
FIG. 6 is a pictorial illustration of a cell that is used in the reduction process.
Figures 7, 7A:
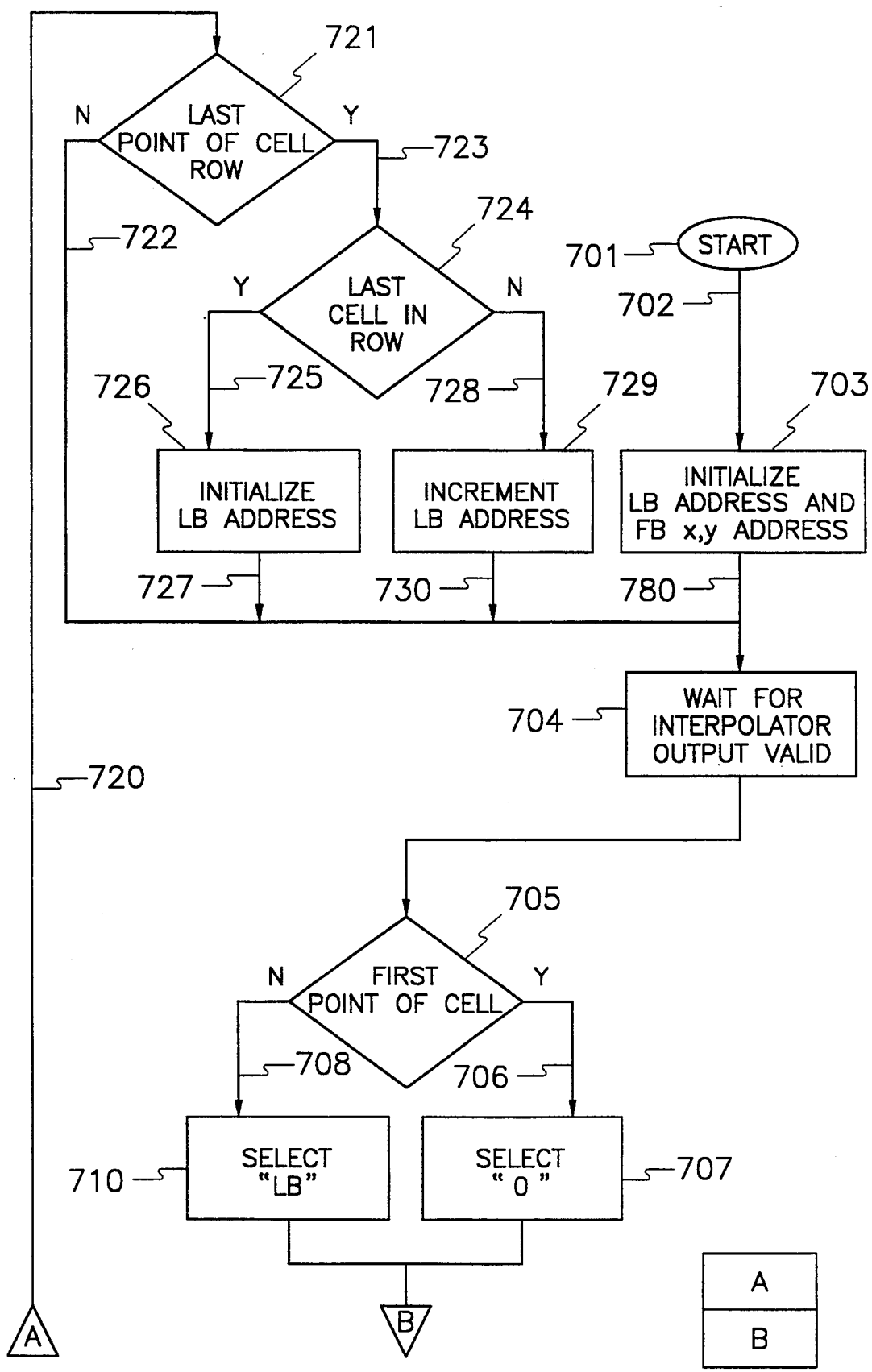
FIGS. 7, 7A-7B are high level flow charts showing the operation of the controller which controls the architecture of the present invention.
Figure 7B:
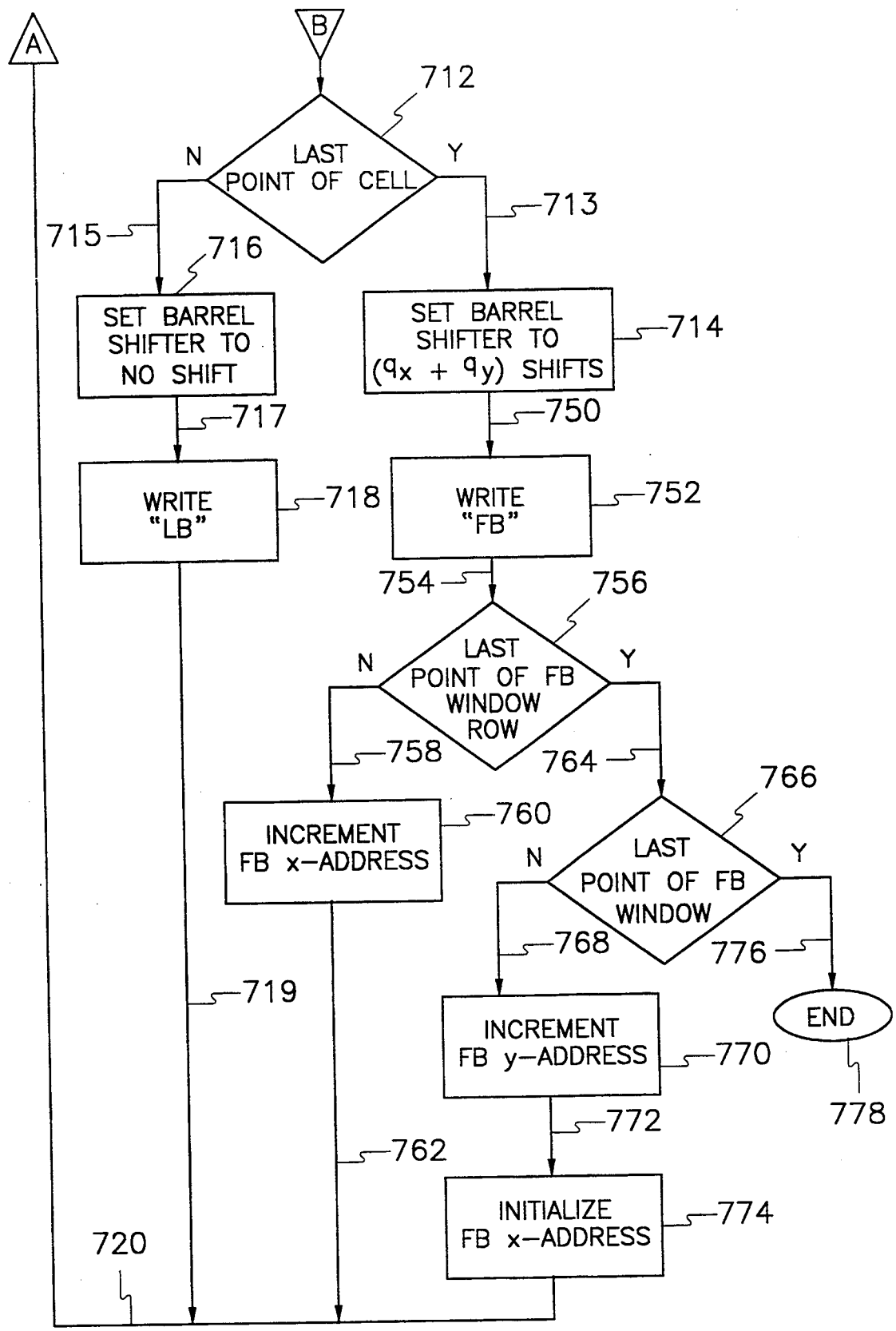

FIG. 6 shows the cell 501 and the nomenclature used in the flow chart of FIG. 7. It is assumed that the image is processed in a raster scan fashion, row by row, from left to right, and from top to bottom. Pixel 602 (also labelled A) of FIG. 6 is called "first point of cell", pixel 604 (also labelled H) is called "last point of cell". Pixels 606 (also labelled D) and pixel 604 are called "last point of cell rows". Points of the frame buffer window (FIG. 5B) in which the result is stored are labelled in a similar way.

Referring now to FIG. 7, the operation of controller 116 is initiated with a start block 701. Thereafter, control is passed along a logic path 702 to an operational block 703.

As shown by operational block 703, the controller 116 is then configured to initialize the line buffer 312 address (the first address position) and to initialize the frame buffer 112 x and y address (defined as address x, y,).

As shown by operational block 704, the controller 116 instructs the shrinking module 108 to wait for an output from the interpolator 104. A valid output would be a pixel value. In the present example, interpolator 104 first outputs the value of pixel 510. Control is then passed to a decisional block 705.

As shown by decisional block 705, the controller 116 is then configured to determine whether pixel 510 is the first point of the cell. In the present example, pixel 510 is the first point of the cell and as such, control is passed along a logic path 706 to an operational block 707.

As shown by operational block 707, the controller 116 then instructs the multiplexer 316 to select the logic value of 0. The 0 value is then inputted to the adder 302 where it is added to the value of pixel 510. This summation is then outputted to barrel shifter 306. Control is then passed to a decisional block 712.

As shown by decisional block 712, the controller 116 is then configured to determine whether pixel 510 is the last point of a cell. Pixel 510 is not the last point of the cell and as such control is passed along a logic path 715 to an operational block 716.

As shown by operational block 716, the controller 116 sets the barrel shifter 306 to a no shift position. Control is then passed along a logic path 717 to an operational block 718.

As shown by operational block 718, the controller 116 is then configured to write the output of the barrel shifter 306 (i.e., currently only the value of pixel 510) into the first address of the line buffer 312. Control is then passed along logic paths 719 and 720 to a decisional block 721.

As shown by decisional block 721, the controller 116 is then configured to determine whether pixel 510 is the last point of the cell row. Pixel 510 is not the last point of the cell row and as such control is returned along a logic path 722 to operational block 704.

As shown by operational block 704, the controller 116 is then configured to instruct the shrinking module 108 to wait for the next pixel from the interpolator 104. The next pixel outputted by the interpolator 104 is pixel 511. Control is then passed to decisional block 705.

As shown by decisional block 705, controller 116 determines whether pixel 511 is the first point of the cell. Pixel 511 is not the first point of the cell and as such control is passed along a logic path 708 to an operational block 710.

As shown by operational block 710, controller 116 is then configured to set the multiplexer 316 to select the current value stored in the line buffer 312 as an input to the adder 302. In this operation, the adder 302 will add the value of pixel 511 to the current value in the line buffer 312, which at this point is only the value of pixel 510. Control is then passed to decisional block 712.

As shown by decisional block 712, controller 116 is then configured to determine whether pixel 511 is the last point of the cell. Pixel 511 is not the last point of the cell and as such control is passed along a logic path 715 to operational block 716.

As shown by operational block 716, controller 116 is then configured to set the barrel shifter 306 to the no shift position. Control is then passed along a logic path 717 to operational block 718.

As shown by operational block 718, controller 116 is then configured to write the contents of the barrel shifter 306, and thus the contents of adder 302 because no shift has occurred, into the line buffer 312. At this point, the value rewritten into the line buffer is the sum of pixels 510 and 511. Control is then passed along logic paths 719 and 720 to decisional block 721.

As shown by decisional block 721, controller 116 is then configured to determine whether pixel 511 is the last pixel of the cell row. Pixel 511 is not the last point of the cell row and as such control is returned along logic path 722 to operational block 704.

As shown by operational block 704, controller 116 is then configured to instruct the shrinking module 108 to wait for the next pixel output from the interpolator 104. In the present case, the next pixel outputted by the interpolator 104 is pixel 512. Control is then passed to decisional block 705.

As shown by decisional block 705, controller 116 is then configured to determine whether pixel 512 is the first point of the cell. Pixel 512 is not the first point of the cell and as such control is passed along logic path 708 to operational block 710.

As shown by operational block 710, controller 116 is then configured to instruct the multiplexer 316 to input the contents current address (first address) of the line buffer 312 into the adder 302. At this point, the contents of the first address of the line buffer 312 are added with the value of 512 and as such the adder has now accumulated the values of pixels 510, 511 and 512. Control is then passed to decisional block 712.

As shown by decisional block 712, controller 116 is then configured to determine whether pixel 512 is the last point of the cell. Pixel 512 is not the last point of the cell and as such control is passed along logic path 715 to operational block 716.

As shown by operational block 716, controller 116 is then configured to set the barrel shifter 306 to the no shift position. Control is then passed along logic path 716 to operational block 718.

As shown by operational block 718, controller 116 is then configured to write the contents outputted from the barrel shifter 306, (i.e., the sum of pixels 510, 511 and 512) to the first address of the line buffer 312. Control is then passed along logic paths 719 and 720 to decisional block 721.

As shown by decisional block 721, controller 116 is then configured to determine whether pixel 512 is the last point of the cell row. Pixel 512 is not the last point of the cell row and as such control is returned along logic path 722 to operational block 704.

As shown by operational block 704, controller 116 is then configured to set the shrinking module 108 to receive the next output pixel from the interpolator 104. In the present case, the next output pixel would be pixel 513. Control is then passed to decisional block 705.

As shown by decisional block 705, controller 116 is then configured to determine whether pixel 513 is the first point of the cell. Pixel 513 is not the first point of the cell and as such control is passed along logic path 708 to operational block 710.

As shown by operational block 710, controller 116 is then configured to instruct the multiplexer 316 to select the value stored in the first address of line buffer 108 and input it to the adder 302 where it is added to the value of pixel 513. Control is then passed to decisional block 712.

As shown by decisional block 712, controller 116 is then configured to determine whether pixel 513 is the last point of the cell. Pixel 513, although being the last pixel of the cell row, is not the last pixel of the entire cell 501. As such, control is passed along logic path 715 to operational block 716.

As shown by operational block 716, controller 116 is configured to set the barrel shifter 306 to the no shift position. Control is then passed along logic path 717 to operational block 718.

As shown by operational block 718, controller 116 is then configured to write the contents of barrel shifter 306 into the first address of line buffer 108. As such, the first address of line buffer 108 now contains the sum of the values for pixels 510, 511, 512, and 513. Control is then passed along logic paths 719 and 720 to decisional block 721.

As shown by decisional block 721, controller 116 is then configured to determine whether pixel 513 is the last point of the cell 501 row. Pixel 513 is the last point of the cell 501 row and as such control is passed along logic path 723 to decisional block 724.

As shown by decisional block 724, controller 116 is then configured to determine whether cell 501 is the last cell in the cell row. Cell 501 is not the last cell in the cell row, and as such control is passed along logic path 728 to operational block 729.

As shown by operational block 729, controller 116 is then configured to increment the line buffer address of the line buffer 312. For purposes of this discussion, assume that the pointer is now at the second address of the line buffer 312. Recall that the first address of the line buffer has stored therein the summation of pixels 510–513. Control is then passed along logic path 730 to operational block 704.

As shown by operational block 704, controller 116 is then configured to instruct the shrinking module 108 to wait for the next pixel outputted from the interpolator 104. In the present example, the next output pixel from the interpolator 104 is pixel 518. Control is then passed to decisional block 705.

As shown by decisional block 705, controller 116 is then configured to determine whether pixel 518 is the first point of the cell (i.e., in this case cell 502). Pixel 518 is in fact the first point of cell 502 and as such control is passed along logic path 706 to operational block 707.

As shown by operational block 707, controller 116 is then configured to instruct the multiplexer 316 to select the logic value of 0 for input to the adder 302. The adder 302 adds the logic value 0 with the value for pixel 518 and presents it as the input to the barrel shifter 306. Control is then passed to decisional block 712.

As shown by decisional block 712, controller 116 is then configured to determine whether pixel 518 is the last point of cell 502. Pixel 518 is not the last point of cell 502, and as such control is passed along logic path 715 to operational block 716.

As shown by operational block 716, controller 116 is then configured to set the barrel shifter 306 to a no shift. Control is then passed along logic path 717 to operational block 718.

As shown by operational block 718, controller 116 is then configured to write the output of the barrel shifter 306 (and thus the value of pixel 518) to the current address of the line buffer 312, which at this point is the second address. Control is then passed along logic paths 719 and 720 to decisional block 721.

As shown by decisional block 721, controller 116 is then configured to determine whether pixel 518 is the last pixel of the cell 502 row. Pixel 518 is not the last point of the cell 502 row and as such control is passed along logic path 722 to operational block 704.

As shown by operational block 704, controller 116 is then configured to instruct the shrinking module 108 to wait for the next pixel output from the interpolator 104. In the present example, the next output pixel from the interpolator 104 is pixel 519. Control is then passed to decisional block 705.

As shown by decisional block 705, controller 116 is then configured to determine whether pixel 519 is the first point of cell 502. Pixel 519 is not the first point of cell 502 and as such control is passed along logic path 708 to operational block 710.

As shown by operational block 710, controller 116 is then configured to instruct the multiplexer 316 to select the value stored in the second address of line buffer 312 for input to the adder 302 where that value is summed with the value for pixel 519. The corresponding sum is then outputted to the barrel shifter 306. Control is then passed to decisional block 712.

As shown by decisional block 712, controller 116 is then configured to determine whether pixel 519 is the last point of the cell 502. Pixel 519 is not the last cell and as such control is passed along logic path 715 to operational block 716.

As shown by operational block 716, controller 116 is then configured to set the barrel shifter 306 to a no shift. Control is then passed along logic path 717 to operational block 718.

As shown by operational block 718, controller 116 is then configured to write the output of the barrel shifter 306 to the second address of the line buffer 312. At this point, the contents of the second address of the line buffer 312 would be the summation of pixels 518 and 519. Control is then passed along logic paths 719 and 720 to decisional block 721.

As shown by decisional block 721, controller 116 is then configured to determine whether pixel 519 is the last point of the cell 502 row. Pixel 519 is not the last point of the cell 502 row, and as such control is returned along logic path 722 to operational block 704.

As shown by operational block 704, controller 116 is then configured to instruct the shrinking module 108 to wait for the next output pixel from the interpolator 104. In the present case, the next output pixel is pixel 520. Control is then passed to decisional block 705.

As shown by decisional block 705, controller 116 is then configured to determine whether pixel 520 is the first point of the cell 502. Pixel 520 is not the first point of the cell, and as such control is passed along logic path 708 to operational block 710.

As shown by operational block 710, controller 116 is then configured to instruct the multiplexer 316 to select the current value of the second address of line buffer 312 and input it to the adder 302, where it is added with the value for pixel 520. This summation is then outputted to barrel shifter 306. Control is then passed to decisional block 712.

As shown by decisional block 712, controller 116 is then configured to determine whether pixel 520 is the last point in cell 502. Pixel 520 is not the last point in cell 502, and as such control is passed along logic path 715 to operational block 716.

As shown by operational block 716, controller 116 is then configured to set the barrel shifter 306 to a no shift. Control is then passed along logic path 717 to operational block 718.

As shown by operational block 718, controller 116 is then configured to write the output of the barrel shifter 306 to the second address of the line buffer 312. Control is then passed along logic paths 719 and 720 to decisional block 721.

As shown by decisional block 721, controller 116 is then configured to determine whether pixel 520 is the last point of the cell row. Pixel 520 is not the last point of the cell row, and as such control is passed along logic path 722 to operational block 704.

As shown by operational block 704, controller 116 is then configured to instruct the shrinking circuit 108 to wait for the next output pixel from the interpolator 104. In the present example, the next output pixel from the interpolator 104 is pixel 521. Control is then passed to decisional block 705.

As shown by decisional block 705, controller 116 is then configured to determine whether pixel 521 is the first point of the cell. Pixel 521 is not the first point of the cell, and as such control is passed along logic path 708 to operational block 710.

As shown by operational block 710, controller 116 is then configured to instruct the multiplexer 316 to select the second address of line buffer 312 and input it to the adder 302 where this value is summed with pixel 521. This summation is then outputted to barrel shifter 306. Control is then passed along logic path 719 and 720 to decisional block 721.

As shown by decisional block 721, controller 116 is then configured to determine whether pixel 521 is the last pixel of the cell row. Pixel 521 is the last point of the cell 502 row, and as such control is passed along logic path 723 to decisional block 724.

As shown by decisional block 724, controller 116 is then configured to determine whether cell 502 is the last cell in the row. Cell 502 is not the last cell in the row, and as such control is passed along logic path 728 to operational block 729.

As shown by operational block 729, controller 116 is then configured to increment the line buffer 312 address. For the present example, we will assume that this is the third address of the line buffer 312. Recall that the first address of line buffer 312 has stored therein the summation of values for pixels 510-513, and the second address of line buffer 312 has stored therein the summation of values for pixels 518-521. Control is then passed to operational block 704.

As shown by operational block 704, controller 116 is then configured to instruct the shrinking module 108 to wait for the next output pixel from the interpolator 104. In the present example, the next output pixel is pixel 526. Control is then passed to decisional block 705.

As shown by decisional block 705, controller 116 is then configured to determine whether pixel 526 is the first pixel of cell 503. Pixel 526 is the first pixel of cell 503, and as such control is passed along logic path 706 to operational block 707.

As shown by operational block 707, controller 116 is then configured to instruct the multiplexer 316 to select the logic value 0 for input to the adder where it is added with the value of output pixel 526. This summation is then outputted to the barrel shifter 306. Control is then passed to decisional block 712.

As shown by decisional block 712, controller 116 is then configured to determine whether pixel 526 is the last pixel of cell 503. Pixel 526 is not the last pixel of cell 503, and as such control is passed along logic path 715 to operational block 716.

As shown by operational block 716, controller 116 is then configured to set the barrel shifter 306 to no shift. Control is then passed along logic path 716 to operational block 718.

As shown by operational block 718, controller 116 is then configured to write the output of the barrel shifter 306 in the current address of line buffer 312, which at this point is the third address. Control is then passed along logic paths 719 and 720 to decisional block 721.

As shown by decisional block 721, controller 116 is then configured to determine whether pixel 526 is the last point of the cell 503 row. Pixel 526 is not the last point of the cell 503 row, and as such control is returned along logic path 722 to operational block 704.

As shown by operational block 704, controller 116 is then configured to instruct the shrinking module 108 to wait for the next output pixel from the interpolator 104. In the present example, the next output pixel from the interpolator 104 is pixel 527. Control is then passed to decisional block 705.

As shown by decisional block 705, controller 116 is then configured to determine whether pixel 527 is the first point of cell 503. In the present example, pixel 527 is not the first point of cell 503, and as such control is passed along logic path 708 to operational block 710.

As shown by operational block 710, controller 116 is then configured to instruct the multiplexer 316 to select the contents of the third address of line buffer 312 for input to the adder 302, where this is summed with the value for pixel 527. This summation is then outputted to barrel shifter 306. Control is then passed to decisional block 712.

As shown by decisional block 712, controller 116 is then configured to determine whether pixel 527 is the last pixel of cell 503. In the present example, pixel 527 is not the last pixel of cell 503, and as such control is passed along logic path 715 to operational block 716.

As shown by operational block 716, controller 116 is then configured to set the barrel shifter 306 to no shift. Control is then passed along logic path 717 to operational block 718.

As shown by operational block 718, controller 116 is then configured to write the output of the barrel shifter 306 to the third address of line buffer 312. What is being written to the third address of line buffer 312 is the summation of pixels 526 and 527. Control is then passed along logic paths 719 and 720 to decisional block 721.

As shown by decisional block 721, controller 116 is then configured to determine whether pixel 527 is the last pixel of the cell row. In the present example, pixel 527 is not the last pixel of the cell row, and as such control is returned along logic path 722 to operational block 704.

As shown by operational block 704, controller 116 is then configured to instruct the shrinking circuit 108 to wait for the next output pixel from the interpolator 104. In the present example, the next output pixel from the interpolator 104 is pixel 528. Control is then passed to decisional block 705.

As shown by decisional block 705, controller 116 is then configured to determine whether pixel 528 is the first point of cell 503. In the present example, pixel 528 is not the first point of cell 503, and as such control is passed along logic path 708 to operational block 710.

As shown by operational block 710, controller 116 is then configured to instruct the multiplexer 316 to select the contents of the third address of line buffer 312 for input to the adder 302, where this is summed with the value for pixel 528. This summation is then outputted to barrel shifter 306. Control is then passed to decisional block 712.

As shown by decisional block 712, controller 116 is then configured to determine whether pixel 528 is the last pixel of cell 503. Pixel 528 is not the last point of cell 503, and as such control is passed along logic path 715 to operational block 716.

As shown by operational block 716, controller 116 is then configured to set the barrel shifter 306 to the no shift position. Control is then passed along logic path 716 to operational block 718.

As shown by operational block 718, controller 116 is then configured to write the output of barrel shifter 306 (the summation of pixels 526-528) to the third address of line buffer 312. Control is then passed along logic paths 719 and 720 to decisional block 721.

As shown by decisional block 721, controller 116 is then configured to determine whether pixel 528 is the last pixel of the cell 503 row. Pixel 528 is not the last point of the cell 503 row, and as such control is returned along logic path 722 to operational block 704.

As shown by operational block 704, controller 116 is then configured to instruct the shrinking module 108 to wait for the next output pixel from the interpolator 104. In the present example, the next output pixel from interpolator 104 is pixel 529. Control is then passed to decisional block 705.

As shown by decisional block 705, controller 116 is then configured to determine whether pixel 529 is the first pixel of cell 503. Pixel 529 is not the first pixel of cell 503, and as such control is passed along logic path 708 to operational block 710.

As shown by operational block 710, controller 116 is then configured to instruct the multiplexer 316 to select the contents of the third address of line buffer 312 for input to the adder 302, where it is added with the value for pixel 529. The summation is then outputted from the adder 302 to the barrel shifter 306. Control is then passed to decisional block 712.

As shown by decisional block 712, controller 116 is then configured to determine whether pixel 529 is the last pixel of cell 503. Pixel 529, although the last pixel in the row, is not the last pixel of cell 503, and as such control is passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of barrel shifter 306 (the summation of pixels 526-529) to the third address of line buffer 312. Control is then passed along logic paths 719 and 720 to decisional block 712.

As shown by decisional block 721, controller 116 is then configured to determine whether pixel 529 is the last pixel of the cell 503 row. Pixel 529 is indeed the last pixel of the cell 503 row, and as such control is passed along logic path 723 to decisional block 724.

As shown by decisional block 724, controller 116 is then configured to determine whether cell 503 is the last cell in the row. Cell 503 is the last cell in the row, and as such control is passed along logic path 725 to an operational block 726.

As shown by operational block 726, controller 116 initializes the line buffer address 312. In other words, controller 116 repositions the pointer to the first address of line buffer 312. Control is then passed along logic path 727 to operational block 704.

As shown by operational block 704, controller 116 is then configured to instruct the shrinking module 108 to wait for the next output pixel from the interpolator 104. In the present case, the next output pixel from the interpolator 104 is pixel 514 of cell 501. Control is then passed to decisional block 705.

As shown by decisional block 705, controller 116 is then configured to determine whether pixel 514 is the first pixel of cell 501. Pixel 514 is not the first point of cell 501, and as such control is passed along logic path 708 to operational block 710.

As shown by operational block 710, controller 116 is then configured to instruct the multiplexer 316 to select the contents of the first address of line buffer 312 to be inputted to the adder 302 where it is summed with the value for pixel 514. This summation is then outputted to barrel shifter 306. Control is then passed to decisional block 712.

As shown by decisional block 712, controller 116 is then configured to determine whether pixel 514 is the last pixel of cell 501. Pixel 514 is not the last pixel of cell 501, and as such control is passed along logic path 715 to operational block 716.

As shown by operational block 716, controller 116 is then configured to set the barrel shifter 316 to the no shift position. Control is then passed along logic path 717 to operational block 718.

As shown by operational block 718, controller 116 is then configured to write the output of the barrel shifter 306 (the summation of pixels 510-514) to the first address of the line buffer 312. Control is then passed along logic paths 719 and 720 to decisional block 721.

As shown by decisional block 721, controller 116 is then configured to determine whether pixel 514 is the last pixel of the cell row. In the present example, pixel 514 is not the last pixel of the cell row, and as such control is returned along logic path 722 to operational block 704.

As shown by operational block 704, controller 116 is then configured to instruct the shrinking module 108 to wait for the next output pixel from the interpolator 104. In the present example, the next output pixel from the interpolator 104 is pixel 515. Control is then passed to decisional block 705.

As shown by decisional block 705, controller 116 is then configured to determine whether pixel 515 is the first pixel of cell 501. Pixel 515 is not the first point of cell 501, and as such control is passed along logic path 708 to operational block 710.

As shown by operational block 710, controller 116 is then configured to instruct the multiplexer 316 to select the contents of the first address of line buffer 312 for input to the adder 302 where it is summed with the value of pixel 515. This summation is then outputted to the barrel shifter 306. Control is then passed to decisional block 712.

As shown by decisional block 712, controller 116 is then configured to determine whether pixel 515 is the last pixel of cell 501. Pixel 515 is not the last pixel of cell 501, and as such control is passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of the barrel shifter (i.e., the summation of pixels 510–515) into the first address of the line buffer 312. Control is then passed along logic paths 719 and 720 to decisional block 721.

As shown by decisional block 721, controller 116 is then configured to determine whether pixel 515 is the last pixel of the cell row. Pixel 515 is not the last point of the cell row, and as such control is returned along logic path 722 to operational block 704.

As shown by operational block 704, controller 116 is then configured to instruct the shrinking module 108 to wait for the next output pixel from the interpolator 104. In the present example, the next output pixel from the interpolator 104 is pixel 516. Control is then passed to decisional block 705.

As shown by decisional block 705, controller 116 is then configured to determine whether pixel 516 is the first pixel of cell 501. Pixel 516 is not the first point of cell 501, and as such control is passed along logic path 708 to operational block 710.

As shown by operational block 710, controller 116 is then configured to instruct the multiplexer 316 to select the contents of the first address of line buffer 312 for input to the adder 302 where it is added with the value for pixel 516. This summation is then outputted to barrel shifter 306. Control is then passed to decisional block 712.

As shown by decisional block 712, controller 116 is then configured to determine whether pixel 516 is the last pixel of cell 501. Pixel 516 is not the last pixel of cell 501, and as such control is passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of barrel shifter 306 (summation of pixels 510–516) into the first address of the line buffer 312. Control is then passed along logic paths 719 and 720 to decisional block 721.

As shown by decisional block 721, controller 116 is then configured to determine whether pixel 516 is the last pixel of the cell row. In the present example, pixel 516 is not the last point of the cell row, and as such control is returned along logic path 722 to operational block 704.

As shown by operational block 704, controller 116 is then configured to instruct the shrinking module 108 to wait for the next output pixel from the interpolator 104. In the present example, the next output pixel from the interpolator 104 is pixel 517. Control is then passed to decisional block 705.

As shown by decisional block 705, controller 116 is then configured to determine whether pixel 517 is the first pixel of cell 501. Pixel 517 is not the first point of cell 501, and as such control is passed along logic path 708 to operational block 710.

As shown by operational block 710, controller 116 is then configured to instruct the multiplexer 316 to select the contents of the first address of line buffer 312 to be inputted to the adder 302 where it will be added with the value of pixel 517. This summation is then outputted to the barrel shifter 306. Control is then passed to decisional block 712.

As shown by decisional block 712, controller 116 is then configured to determine whether pixel 517 is the last pixel of cell 501. In the present example, pixel 517 is in fact the last pixel of cell 501, and as such control is then passed along a logic path 713 to operational block 714.

As shown by operational block 714, controller 116 is then configured to instruct the barrel shifter 306 perform a shift equal to $(q_x+q_y)$. In the present example, $q_x$ is 2 while $q_y$ is 1, and as such, the barrel shifter 302 is set to divide the summation of all the pixels, pixels 510–515, by a factor of 8, which is equal to 3 shifts ($2^3=8$) in the barrel shifter 306. It can be seen, because $q_x+q_y$ and as such, the column length and row length of the cell 501 is set to a power of 2, the division of the pixels contained in cell 501 can be performed by a simple barrel shifter as opposed to complicated multiplication and/or division circuitry. Control is then passed along logic path 750 to operational block 752.

As shown by operational block 752, controller 116 is then configured to write the value of the summed pixels for cell 501 into the $X_1Y_1$ address (not shown) of frame buffer 112. This output pixel is denoted as output pixel 560 and is shown in FIG. 5B. Control is then passed along logic path 754 to decisional block 756.

As shown by decisional block 756, controller 116 is then configured to determine whether the output pixel 560 is the last output pixel of the frame buffer window row. In the present example, output pixel 560 is not the last point of the frame buffer window, and as such control is passed along logic path 758 to operational block 760.

As shown by operational block 760, controller 116 is then configured to increment the frame buffer X address from $X_1$ to $X_2$. Control is then passed along logic paths 762 and 720 to decisional block 721.

As shown by decisional block 721, controller 116 is then configured to determine whether pixel 517 is the last pixel of the cell 501 row. Pixel 517 is the last point of the cell 501 row, and as such control is passed along logic path 723 to decisional block 724.

As shown by decisional block 724, controller 116 is then configured to determine whether cell 501 is the last cell in the cell row. Cell 501 is not the last cell in the cell row, and as such control is passed along logic path 728 to operational block 729.

As shown by operational block 729, controller 116 is then configured to increment the line buffer 312 address from the first address to the second address. Recall that the second address has stored the values for pixels 518–521 and now the remaining pixels in the second row of cell 502 will also be added to this address location. Control is then passed to operational block 704.

As shown by operational block 704, controller 116 is then configured to instruct the shrinking module 108 to wait for the next output pixel from the interpolator 104. In the present example, the next output pixel is pixel 522 of cell 502. Control is then passed to decisional block 705.

As shown by decisional block 705, controller 116 is then configured to determine whether pixel 522 is the first point of the cell 502. Pixel 522 is not the first point of the cell 502, and as such control is passed along logic path 708 to operational block 710.

As shown by operational block 710, controller 116 is then configured to instruct the multiplexer 316 to select the contents of the second address of line buffer 312 to be inputted to adder 302 and thus to be summed with the value for pixel 522. This summation is then outputted to barrel shifter 306. Control is then passed to decisional block 712.

As shown by decisional block 712, controller 116 is then configured to determine whether pixel 522 is the last pixel of cell 502. Pixel 522 is not the last point of cell 502, and as such control is then passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of the barrel shifter 306 (summation of pixels 518–522) into the second address of line buffer 312. Control is then passed along logic paths 719 and 720 to decisional block 721.

As shown by decisional block 721, controller 116 is then configured to determine whether pixel 522 is the last pixel of the cell 502 row. Pixel 522 is not the last pixel of the cell 502 row, and as such control is then returned along logic path 722 to operational block 704.

As shown by operational block 704, controller 116 is then configured to instruct the shrinking module 108 to wait for the next output pixel from the interpolator 104. In the present example, the next output pixel from interpolator 104 is pixel 523. Control is then passed to decisional block 705.

As shown by decisional block 705, controller 116 is then configured to determine whether pixel 523 is the first pixel of cell 502. Pixel 523 is not the first pixel of cell 502, and as such control is then passed along logic path 708 to operational block 710.

As shown by operational block 710, controller 116 is then configured to instruct the multiplexer 316 to select the contents of address 2 of line buffer 312 and input the same to adder 312 where it is added with the value of pixel 523. This summation is then outputted to barrel shifter 306. Control is then passed to decisional block 712.

As shown by decisional block 712, controller 116 is then configured to determine whether pixel 523 is the last pixel of cell 502. Pixel 523 is not the last pixel of cell 502, and as such control is then passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of barrel shifter 306 (i.e., the summation of pixels 518–523) into the second address of line buffer 312. Control is then passed along logic paths 719 and 720 to decisional block 721.

As shown by decisional block 721, controller 116 is then configured to determine whether pixel 523 is the last pixel of the cell 502 row. Pixel 523 is not the last pixel of the cell 502 row, and as such control is then returned along logic path 722 to operational block 704.

As shown by operational block 704, controller 116 is then configured to instruct the shrinking module 108 to wait for the next output pixel from the interpolator 104. In the present example, the next output pixel from the interpolator 104 is pixel 524. Control is then passed to decisional block 705.

As shown by decisional block 705, controller 116 is then configured to determine whether pixel 524 is the first pixel of cell 502. Pixel 524 is not the first pixel of cell 502, and as such control is then passed along logic path 708 to operational block 710.

As shown by operational block 710, controller 116 is then configured to instruct the multiplexer 316 to select the contents of the second address of line buffer 312 to be inputted to the adder 312 where it will be summed with the value of pixel 524. This summation is then outputted to the barrel shifter 306. Control is then passed to decisional block 712.

As shown by decisional block 712, controller 116 is then configured to determine whether pixel 524 is the last pixel of cell 502. Pixel 524 is not the last pixel of cell 502, and as such control is then passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of barrel shift 306 (i.e., the summation of pixels 518–524) into the second address of line buffer 312. Control is then passed along logic paths 719 and 720 to decisional block 721.

As shown by decisional block 721, controller 116 is then configured to determine whether pixel 524 is the last pixel of the cell 502 row. Pixel 524 is not the last point of the cell 502 row, and as such control is then passed along logic path 722 to operational block 704.

As shown by operational block 704, controller 116 is then configured to instruct the shrinking module 108 to wait for the next output pixel from the interpolator 104. In the present example, the next output pixel from the interpolator 104 is pixel 525. Control is then passed to decisional block 705.

As shown by decisional block 705, controller 116 is then configured to determine whether pixel 525 is the first pixel of cell 502. Pixel 525 is not the first pixel of cell 502, and as such control is then passed along logic path 708 to operational block 710.

As shown by operational block 710, controller 116 is then configured to instruct the multiplexer 316 to select the contents of the second address of line buffer 312 and input it into adder 312 where it is added with the value of pixel 525. This summation is then outputted to the barrel shifter 306. Control is then passed to decisional block 712.

As shown by decisional block 712, controller 116 is then configured to determine whether pixel 525 is the last pixel of cell 502. Pixel 525 is in fact the last pixel of cell 502, and as such control is then passed along logic path 713 to operational block 714.

As shown by operational block 714, controller 116 is then configured to set the barrel shifter 306 to ($q_x + q_y$) shifts. In the present example, the cells under consideration are 4×2 cells, and as such a division of 8 and/or 3 shifts would be set for the barrel shifter 306. Control is then passed along logic path 750 to operational block 752.

As shown by operational block 752, controller 116 is then configured to write the output of the barrel shifter 306 (i.e., the average value for the summation of pixels 518–525) into the current address of frame buffer 112 which is $X_2, Y_1$. This point is denoted as output pixel 562 on FIG. 5B. Control is then passed along logic path 754 to decisional block 756.

As shown by decisional block 756, controller 116 is then configured to determine whether output pixel 562 is the last point of the frame buffer window row. Output pixel 562 is not the last point of the frame buffer window row, and as such control is then passed along logic path 758 to operational block 760.

As shown by operational block 760, controller 116 is then configured to increment the frame buffer 112 X address, in this case from $X_2, Y_1$ to $X_3, Y_1$. Control is then passed along logic paths 762 and 720 to decisional block 721.

As shown by decisional block 721, controller 116 is then configured to determine whether pixel 525 is the last pixel of the cell 502 row. Pixel 525 is the last pixel of the cell 502 row, and as such control is then passed along logic path 723 to decisional block 724.

As shown by decisional block 724, controller 116 is then configured to determine whether cell 502 is the last cell in the row. Cell 502 is not the last cell in the row, and as such control is then passed along logic path 728 to operational block 729.

As shown by operational block 729, controller 116 is then configured to increment the line buffer 312 address (from address location 2 to address location 3, which corresponds to pixel values of cell 503). Control is then passed to operational block 704.

As shown by operational block 704, controller 116 is then configured to instruct the shrinking module 108 to wait for the next pixel from the interpolator 104. In the present example, the next pixel outputted by interpolator 104 is pixel 530 of cell 503. Control is then passed to decisional block 705.

As shown by decisional block 705, controller 116 is then configured to determine whether pixel 530 is the first pixel of cell 503. Pixel 530 is not the first pixel of cell 503, and as such control is then passed along logic path 708 to operational block 710.

As shown by operational block 710, controller 116 is then configured to instruct the multiplexer 316 to select the contents of a third address of line buffer 312 and to input the same to adder 312 where it will be summed with the value for pixel 530. This summation is then outputted to barrel shifter 316. Control is then passed to decisional block 712.

As shown by decisional block 712, controller 116 is then configured to determine whether pixel 530 is the last pixel of cell 503. Pixel 530 is not the last pixel of cell 503, and as such control is then passed along logic path 715 to operational block 716.

As shown by operational block 716, controller 116 is then configured to set the barrel shifter 306 to the no shift position. Control is then passed along logic path 716 to operational block 718.

As shown by operational block 718, controller 116 is then configured to write the output of barrel shifter 306 (i.e., the sum of pixels 526–530) into the third address of line buffer 312. Control is then passed along logic paths 719 and 720 to decisional block 721.

As shown by decisional block 721, controller 116 is then configured to determine whether pixel 530 is the last pixel of the cell 503 row. Pixel 530 is not the last pixel of cell 503 row, and as such control is then returned along logic path 722 to operational block 704.

As shown by operational block 704, controller 116 is then configured to instruct the shrinking module 108 to wait for the next pixel outputted by the interpolator 104. In the present example, the next pixel outputted by the interpolator 104 is pixel 531. Control is then passed to decisional block 705.

As shown by decisional block 705, controller 116 is then configured to determine whether pixel 531 is the first pixel of cell 503. Pixel 531 is not the first pixel of cell 503, and as such control is then passed along logic path 708 to operational block 710.

As shown by operational block 710, controller 116 is then configured to instruct the multiplexer 316 to select the contents of the third address of line buffer 312 and input the same to the adder 302 where it will be added with the value of pixel 531. This summation is then outputted to the barrel shifter 306. Control is then passed to decisional block 712.

As shown by decisional block 712, controller 116 is then configured to determine whether pixel 531 is the last pixel of cell 503. Pixel 531 is not the last pixel of cell 503, and as such control is then passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of barrel shifter 306 (i.e., the summation of pixels 526–531) into the third address of line buffer 312. Control is then passed along logic paths 719 and 720 to decisional block 721.

As shown by decisional block 721, controller 116 is then configured to determine whether pixel 531 is the last pixel of the cell 503 row. Pixel 531 is not the last pixel of the cell 503 row, and as such control is then returned along logic path 722 to operational block 704.

As shown by operational block 704, controller 116 is then configured to instruct the shrinking module 108 to wait for the next pixel output by the interpolator 104. In the present example, the next pixel to be outputted by the interpolator 104 is pixel 532. Control is then passed to decisional block 705.

As shown by decisional block 705, controller 116 is then configured to determine whether pixel 532 is the first pixel of cell 503. Pixel 532 is not the first pixel of cell 503, and as such control is then passed along logic path 708 to operational block 710.

As shown by operational block 710, controller 116 is then configured to instruct the multiplexer 316 to select the contents of the third address of line buffer 312 and to input the same to adder 302 where it is summed with the value for pixel 532. This summation is then outputted to the barrel shifter 306. Control is then passed to decisional block 712.

As shown by decisional block 712, controller 116 is then configured to determine whether pixel 532 is the last pixel of cell 503. Pixel 532 is not the last pixel of cell 503, and as such control is then passed along logic path 715 to operational block 716.

As shown by operational block 716, controller 116 is then configured to set the barrel shifter 306 to the no shift position. Control is then passed along logic path 717 to operational block 718.

As shown by operational block 718, controller 116 is then configured to write the output of the barrel shifter 306 (i.e., the summation of pixels 526–532) into the third address location of the line buffer 312. Control is then passed along logic paths 719 and 720 to decisional block 721.

As shown by decisional block 721, controller 116 is then configured to determine whether pixel 532 is the last pixel of cell 503 row. Pixel 532 is not the last pixel of the cell row, and as such control is then returned along logic path 722 to operational block 704.

As shown by operational block 704, controller 116 is then configured to instruct the shrinking module 108 to wait for the next pixel outputted by the interpolator 104. In the present example, the next pixel outputted by the interpolator 104 is pixel 533. Control is then passed to decisional block 705.

As shown by decisional block 705, controller 116 is then configured to determine whether pixel 533 is the first pixel of cell 503. Pixel 533 is not the first point of cell 503, and as such control is then passed along logic path 708 to operational block 710.

As shown by operational block 701, controller 116 is then configured to instruct the multiplexer 316 to select the contents of the third address of line buffer 312 and to input the same to adder 302, where it is added with the value of pixel 533. This summation is then outputted to barrel shifter 306. Control is then passed to decisional block 712.

As shown by decisional block 712, controller 116 is then configured to determine whether pixel 533 is the last pixel of cell 503. Pixel 533 is in fact the last pixel of cell 503, and as such control is then passed along logic path 713 to operational block 714.

As shown by operational block 714, controller 116 is then configured to set the barrel shifter 306 to $(q_x + q_y)$ shifts, or in the present example, a division by a factor of 8 or 3 shifts. Control is then passed along logic path 750 to operational block 752.

As shown by operational block 752, controller 116 is then configured to write the output of the barrel shifter (i.e., the average of the summation of pixels 526–533) into the current address of the frame buffer 112 which would be $X_3, Y_1$. This output pixel is denoted as output pixel 564 on FIG. 5B. Control is then passed along logic path 754 to decisional block 756.

As shown by decisional block 756, controller 116 is then configured to determine whether output pixel 564 is the last point of the frame buffer 112 window row. In the present example, output pixel 564 is in fact the last point of the frame buffer 112 window, and as such control is then passed along logic path 764 to decisional block 766.

As shown by decisional block 766, controller 116 is then configured to determine whether output pixel 564 is the last output pixel of the frame buffer 112 window. Output pixel 564 is not the last output pixel to be generated in the frame buffer 112, and as such control is then passed along logic path 768 to operational block 770.

As shown by operational block 770, controller 116 is then configured to increment the frame buffer 112 Y address from formerly $X_3, Y_1$ to $X_3, Y_2$. Control is then passed along logic path 772 to operational block 774.

As shown by operational block 774, controller 116 is then configured to initialize the frame buffer 112 X address. In other words, the X address of the frame buffer is to be changed from $X_3$ to $X_1$ and therefore the current address of the frame buffer 112 is $X_1, Y_2$. Control is then passed along logic path 720 to decisional block 721.

As shown by decisional block 721, controller 116 is then configured to determine whether pixel 533 is the last pixel of the cell 503 row. Pixel 533 is the last pixel of the cell 503 row, and as such control is then passed along logic path 723 to decisional block 724.

As shown by decisional block 724, the control 116 is then configured to determine whether cell 503 is a last cell in the row. Cell 503 is in fact the last cell in the row and as such control is passed along a logic path 725 to operational block 726.

As shown by operational block 726, the control of 116 is then configured to initialize the line buffer address 312 back to the first address location. Recall that currently the contents of the summation pixels 510 through 517 are stored in the first address of the line buffer 312. However, the first address of line buffer 312 will be rewritten by the values of the pixels located in cell 504. Control is then passed along logic path 727 to operational block 704.

As shown by operational block 704, the control of 116 is then configured to instruct the shrinking module 108 to wait for the next pixel output by the interpolator 104. In the present example, the next pixel output by the interpolator 104 is pixel 534 of cell 504. Control is then passed to decisional block 705.

As shown by decisional block 705, the control of 116 is then configured to determine whether pixel 534 is the first pixel of cell 504. Pixel 534 is in fact the first pixel of cell 504 and as such the control is passed along logic paths 706 to operational block 707.

As shown by operational block 707, the control of 116 is configured to instruct the multiplexer 316 to select the logical zero and input the same to the outer 302 to be added with the value of pixel 534. This summation is then outputted to the barrel shifter 306. Control is then passed to decisional block 712.

As shown by decisional block 712, the controller is then instructed to determine whether pixel 534 is the last pixel of cell 504. Pixel 534 is not the last pixel of cell 504 and as such the control is passed along logic path 715 to operational block 716.

As should be readily apparent to one of ordinary skill in the art, the process performed with respect to cells 501, 502, and 503 is applied in the same fashion to cells 503, 505, and 506, and as such, the detailed analysis and description will not be provided herein. It is sufficient to say that an output pixel 566 will be generated in the $X_1, Y_2$ address of frame buffer 112 and correspond to the average value of pixels 534–540 of cell 504. Similarly, an output pixel 568 will be generated and stored at address location $X_2, Y_2$ of frame buffer 112. Output pixel 568 corresponds to the average of pixels 542–549 of cell 505. Similarly, an output pixel 570 will be generated and stored at address location $X_3, Y_2$ in frame buffer 112. Output pixel 570 corresponds to the average of pixels 550–557 of cell 506.

As shown by decisional block 766, once output pixel 570 has been written into the frame buffer 112 location, the controller 116 will determine that output pixel 570 is the last output pixel to be generated for the frame buffer 112 window and will pass control along a logic path 776 to an end block 778 where operation of the controller 116 is completed.

IV. Alternative Embodiments

The present invention may be encompassed in a variety of alternative embodiments. Such alternative embodiments, include but are not limited to the following:

The cells of FIG. 5 may overlap each other.

The average is a weighted average instead of a simple one. Some sort of multiplication and/or division operation may be needed.

Use of some scaling mechanism during the cell averaging process to reduce the width (number of bits) of the adder 302, barrel shifter 316, multiplexer, and line buffer 312. For example, the scaling can be done on a pixel by pixel basis as data is outputted from the interpolator 104, or on a row by row basis by averaging a cell row and scaling the partial result before accumulating it in the line buffer 312.

While the invention has been particularly shown and described with reference to (a) preferred embodiment(s) thereof, it will be understood by those skilled in the art that (various changes) (the foregoing and other changes) in form and details may be made therein without departing from the spirit and scope of the invention.

Having thus described our invention, what we claim as new and desire to secure by Letters Patent is:

1. An apparatus for scaling the size of a first digital image by a desired scaling factor to achieve a second digital image, the apparatus comprising:
   an interpolator configured to magnify the first digital image by a first scaling factor greater than or equal to one to create an intermediate digital image, said intermediate digital image including a first plurality of pixels, each of said first plurality of pixels having a pixel value; and
   a shrinking logic circuit, coupled to said interpolator, configured to reduce said intermediate digital image generated by said interpolator by a second scaling factor which is limited to always be a power of two to thereby generate the second digital image, said second digital image containing a second plurality of pixels, each of said second plurality of pixels having a pixel value, each one of said second plurality of pixels corresponding to a quantity of said first plurality of pixels, wherein said corresponding quantity of said first plurality of pixels is a power of two, said shrinking logic circuit further configured to average said pixel values of each of said corresponding quantity of said first plurality of pixels and assign said average value to said pixel value of said corresponding one of said second plurality Of pixels corresponding to said quantity of said first plurality of pixels, said second scaling factor thereby reducing said intermediate digital image by a power of two,
   wherein said first scaling factor is determined based upon the desired scaling factor and said second scaling factor.

2. The apparatus of claim 1, further comprising controller means, coupled to said interpolator and said shrinking logic circuit, for controlling the operation of the apparatus, and wherein said intermediate digital image is divided into at least one cell, each of said at least one cell containing said corresponding power of two quantity of said first plurality of pixels, each of said at least one cell having M rows of pixels being of a length equal to a first power of two, and N columns of pixels being of a length equal to a second power of two.

3. The apparatus of claim 2, wherein said shrinking logic circuit comprises:
   an adder configured to add the values of said power of two quantity of said first plurality of pixels in each of said at least one cell; and
   averaging means, coupled to said adder, for determining the average value of said power of two quantity of pixel values summed by said adder, said average value assigned to said corresponding one of said second plurality of pixels.

4. The apparatus of claim 1, wherein said interpolator is configured of electronic circuitry.

5. The apparatus of claim 3, further comprising:
   first buffer means, coupled to said interpolator, for storing the first digital image and also for providing the first digital image to said interpolator; and
   second buffer means, coupled to said shrinking logic circuit for storing the second digital image received from said shrinking circuit.

6. The apparatus of claim 5, wherein said shrinking logic circuit further comprises:
   third buffer means, coupled to said averaging means and to said adder, for storing said added values of said power of two quantity of said first plurality of pixels.

7. The apparatus of claim 5, wherein said second buffer means is configured as a two dimensional single buffer image display device.

8. The apparatus of claim 6, wherein said controller means is configured as a digital signal processor.

9. The apparatus of claim 3, wherein said averaging means determines the average value of said power of two quantity of said first plurality of pixels summed by said adder by performing a binary shift of the binary representation of the summation of said pixel values.

10. An image scaling circuit for scaling the size of a first digital image to generate a second digital image by a desired scaling factor, the image scaling circuit comprising:
   interpolator means for magnifying the first digital image by a first scaling factor greater than or equal to one, and for generating a corresponding intermediate digital image having a first plurality of pixels; said first scaling factor determined by the desired scaling factor and a second scaling factor;
   shrinking means, coupled to said interpolator means, for shrinking said intermediate digital image generated by said interpolator means by said second scaling factor, wherein said second scaling factor is limited to always be a power of two to thereby generate the second digital image, said second digital image containing a second plurality of pixels, each one of said second plurality of pixels corresponding to a quantity of said first plurality of pixels, wherein said corresponding quantity of said first plurality of pixels is a power of two, and further for averaging said pixel values of each of said corresponding quantity of said first plurality of pixels, and further for assigning said average value to said pixel value of said corresponding one of said second plurality of pixels corresponding to said quantity of said first plurality of pixels, said second scaling factor thereby reducing said intermediate digital image by a power of two; and controller means, coupled to said interpolator means and said shrinking means, for controlling the operation of the apparatus, wherein said first scaling factor is determined based upon the desired scaling factor and said second scaling factor.

11. The circuit of claim 10, wherein said intermediate digital image is divided into a plurality of cells, each of said plurality of cells having M rows of pixels being of a length equal to a first power of two, and N columns of pixels being of a length equal to a second power of two, each of said pixels having a pixel value depicted is the second digital image.

12. The circuit of claim 11, wherein said shrinking means comprises:

an adder configured to add the values of said power of two quantity of said first plurality of pixels in each of said plurality of cells;

averaging means; coupled to said adder, for determining the average value of said power of two quantity of pixel values summed by said adder, said average value assigned to said corresponding one of said second plurality of pixels; and buffer means, coupled to said averaging means and to said adder, for storing said added values of said power of two quantity of pixels.

13. A method for scaling a first digital image by a desired scaling factor to a second digital image in an image processor comprising an interpolator having an input and an output, and a shrinking logic circuit having an input coupled to the output of the interpolator, the interpolator and the shrinking logic circuit coupled to and controlled by a controller means, the image processor further comprising a first buffer means coupled to the input of the interpolator and coupled to and controlled by the controller means, and a second buffer means coupled to the output of the shrinking logic circuit and coupled to and controlled by the controller means, the method comprising the steps of:

(a) receiving the first digital image from an external source by said first buffer means and to store the first digital image in said first buffer means;

(b) said controller means sending a first instruction to said first buffer means to provide the first digital image stored in said first buffer means to said interpolator;

(c) said controller means sending a second instruction signal to said interpolator to initiate a first scaling operation which comprises the steps of:

(i) receiving the first image by said interpolator, and (ii) enlarging the first image by a first scaling factor greater than or equal to one by said interpolator to result in an enlarged image having a first plurality of pixels, said first scaling factor determined by the desired scaling factor and a second scaling factor which is limited to always be a power of two;

(d) controller means sending a third instruction signal to said shrinking logic circuit to initiate a second scaling operation which comprises the steps of:

(i) receiving said enlarged image from said interpolator by said shrinking logic circuit, and (ii) reducing said enlarged image received from said interpolator by said second scaling factor to produce the second digital image by said shrinking logic circuit, said second digital image comprising a second plurality of pixels, each one of said second plurality of pixels corresponding to a quantity of said first plurality of pixels, wherein said corresponding quantity of said first plurality Of pixels is a power of two, said reducing step comprising the steps of:

(1) dividing said enlarged image into a plurality of cells, each of said plurality of cells including a power of two quantity of said first plurality of pixels, (2) adding the values of each of said quantity of said first plurality of pixels, resulting in a total pixel value for each of the plurality of cells, and (3) averaging said total pixel value for each of said corresponding quantity of said first plurality of pixels;

(e) said controller means sending a fourth instruction signal to said shrinking logic circuit to provide the second digital image to said second buffer means; and (f) said controller means sending a fifth instruction signal to said second buffer means to receive the second digital image from said shrinking logic circuit and to store the second digital image in said second buffer means.

* * * * *

UNITED STATES PATENT AND TRADEMARK OFFICE
CERTIFICATE OF CORRECTION

PATENT NO. : 5,335,295
DATED : August 2, 1994
INVENTOR(S) : Ferracini et al

It is certified that error appears in the above-indentified patent and that said Letters Patent is hereby corrected as shown below:

Column 4, line 48, delete "405" and replace therein --403--.

Column 15, line 21, after "shifter", insert --306--.

Column 15, line 36, after "705" insert --of cell 501.--.

Column 15, line 45, delete "302", and insert --306--.

Column 23, line 57, replace "Of" with "of".

Column 24, line 56, after "two" insert --,--.

Signed and Sealed this

Twenty-eighth Day of November 1995

Attest:

BRUCE LEHMAN

*Attesting Officer*   *Commissioner of Patents and Trademarks*